H. WHITTIER.
Thrashing Machine.

No. 108,421.  Patented Oct. 18, 1870.

WITNESSES:  INVENTOR:

United States Patent Office.

HAZEN WHITTIER, OF WEST ROXBURY, MASSACHUSETTS.

Letters Patent No. 108,421, dated October 18, 1870.

IMPROVEMENT IN THRASHING-MACHINES.

The Schedule referred to in these Letters Patent and making part of the same.

*To all whom it may concern:*

I, HAZEN WHITTIER, of West Roxbury, in the county of Norkfolk and State of Massachusetts, have invented certain new and useful Improvements in Thrashing-Machines, of which the following is a specification.

The Nature of the Invention.

The nature of my invention consists in combining and arranging a horizontal cam-disk, and a number of arms, with a double thrashing-table, in such a manner that the whole may work together to thrash grain without injuring the straw, the same being combined with a winnowing device.

Description of the Accompanying Drawing.

Figure 1:
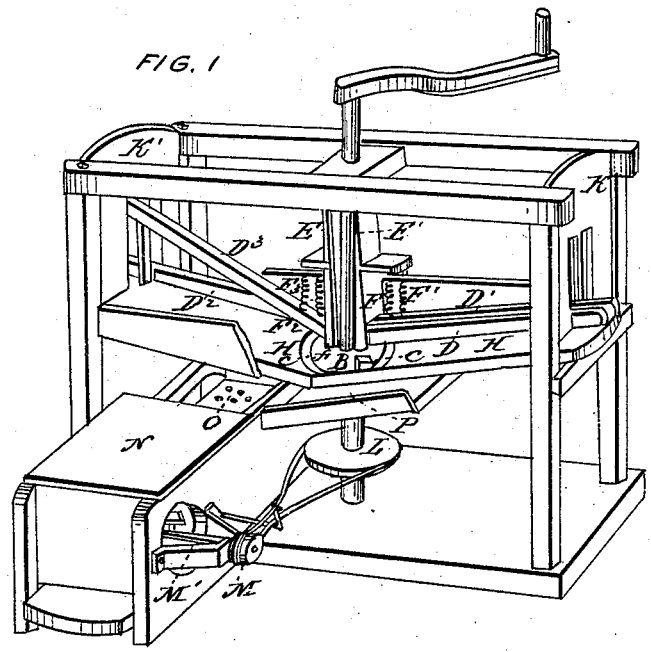
Figure 2:
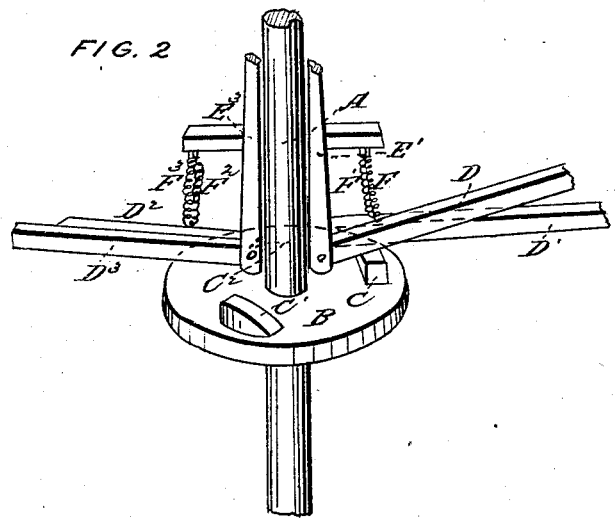

Figure 1 is a perspective view of my machine.
Figure 2 is a perspective view, showing a part, that is, the cam disk and the thrashing-arms or flails.

General Description.

A represents the main shaft of the machine.
B is a cam-disk, attached to the shaft A, and is provided with wedge-shaped cams $C C^1 C^2$, as shown.
$D D^1 D^2 D^3$ are thrashing-arms or flails, and are hung to the hangers $E^1 E^3$, being operated by the cams $C C^1$, &c.
The springs $F F^1 F^2 F^3$ react on the arms $D D^1 D^2 D^3$, to throw them down, and thus give a smart blow upon the grain heads.

H and H are inclined tables, upon which the grain heads are placed while being thrashed.
These tables being inclined also serve to conduct the grain to an opening under the cam-disk B, from which it is conducted into the winnowing device O, by the trough P.
K and K' are partitions or shields, and serve as guides to keep the flails in place. These may be located as shown, or in any desired position, along the length of the flail.
L is a pulley, attached to the main shaft A, and communicates motion through a belt to the fan-wheel M M'.
N is a case, containing an ordinary winnowing device, that is, a fan-blower, M', and a self-acting sieve, O, arranged in any of the common methods.
To use my machine, motion is given to the disk B, which gives a rapid thrashing action to the flails D $D^1$, &c., and the grain is placed upon the incline tables H H.
One of the advantages of my machine is, that it will thrash out the grain without injuring the straw.
I claim as my invention—
The combination of the pivoted arms or flails D $D^1$ $D^2 D^3$ with the cam-disk B, arranged and operating substantially as described, and for the purpose set forth.

Witnesses:            HAZEN WHITTIER.
   JAS. L. CONANT,
   T. G. PARKER.